United States Patent
Sriramulu et al.

(10) Patent No.: US 11,682,762 B2
(45) Date of Patent: Jun. 20, 2023

(54) NANOCRYSTALS OF POLYCRYSTALLINE LAYERED LITHIUM NICKEL METAL OXIDES

(71) Applicant: CAMX Power LLC, Lexington, MA (US)

(72) Inventors: Suresh Sriramulu, Lexington, MA (US); Jane Rempel, Arlington, MA (US); Adrian W. Pullen, Boston, MA (US); David Ofer, Lexington, MA (US)

(73) Assignee: CAMX Power LLC, Lexington, MA (US)

( * ) Notice: Subject to any disclaimer, the term of this patent is extended or adjusted under 35 U.S.C. 154(b) by 0 days.

(21) Appl. No.: 17/481,719

(22) Filed: Sep. 22, 2021

(65) Prior Publication Data

US 2022/0006086 A1 Jan. 6, 2022

Related U.S. Application Data

(63) Continuation of application No. 16/096,403, filed as application No. PCT/US2017/029913 on Apr. 27, 2017, now Pat. No. 11,158,853.

(60) Provisional application No. 62/328,447, filed on Apr. 27, 2016.

(51) Int. Cl.
| | |
|---|---|
| H01M 4/00 | (2006.01) |
| H01M 4/525 | (2010.01) |
| H01M 10/052 | (2010.01) |
| C01G 53/00 | (2006.01) |
| H01M 4/36 | (2006.01) |
| H01M 4/62 | (2006.01) |

(52) U.S. Cl.
CPC ............ *H01M 4/525* (2013.01); *C01G 53/42* (2013.01); *C01G 53/66* (2013.01); *H01M 4/366* (2013.01); *H01M 4/62* (2013.01); *H01M 4/621* (2013.01); *H01M 10/052* (2013.01); *C01P 2002/60* (2013.01); *C01P 2002/76* (2013.01); *C01P 2002/77* (2013.01); *C01P 2006/40* (2013.01)

(58) Field of Classification Search
CPC ...... H01M 4/525; H01M 4/621; H01M 4/366; H01M 10/052; C01G 53/42–70
See application file for complete search history.

(56) References Cited

U.S. PATENT DOCUMENTS

| | | | |
|---|---|---|---|
| 6,071,649 A | 6/2000 | Mao et al. | |
| 6,921,609 B2 | 7/2005 | Lampe-Onnerud et al. | |
| 7,381,496 B2 | 6/2008 | Onnerud et al. | |
| 8,790,827 B2 | 7/2014 | Yanagihara et al. | |
| 9,209,455 B2 | 12/2015 | Ofer et al. | |
| 9,391,317 B2 | 7/2016 | Ofer et al. | |
| 9,911,518 B2 | 3/2018 | Kameyama et al. | |
| 11,158,853 B2 * | 10/2021 | Pullen | H01M 4/525 |
| 2005/0181280 A1 | 8/2005 | Ceder et al. | |
| 2005/0188128 A1 | 8/2005 | Koshiba | |
| 2008/0131782 A1 | 6/2008 | Hagiwara et al. | |
| 2009/0104530 A1 | 4/2009 | Shizuka et al. | |
| 2009/0121179 A1 | 5/2009 | Shi | |
| 2012/0009474 A1 | 1/2012 | Yanagihara et al. | |
| 2013/0304375 A1 | 11/2013 | Lee et al. | |
| 2014/0197357 A1 | 7/2014 | Ofer et al. | |
| 2015/0188136 A1 | 7/2015 | Mori et al. | |
| 2016/0172674 A1 | 6/2016 | Oda et al. | |
| 2016/0181611 A1 | 6/2016 | Cho et al. | |
| 2016/0254539 A1 | 9/2016 | Kagei et al. | |
| 2018/0013145 A1 | 1/2018 | Choi et al. | |
| 2018/0040889 A1 | 2/2018 | Choi et al. | |
| 2018/0040890 A1 | 2/2018 | Choi et al. | |
| 2018/0040891 A1 | 2/2018 | Choi et al. | |
| 2018/0040896 A1 | 2/2018 | Choi et al. | |

FOREIGN PATENT DOCUMENTS

| | | |
|---|---|---|
| CN | 101071857 A | 11/2007 |
| CN | 107591519 A | 1/2018 |
| EP | 2023426 A1 | 2/2009 |
| JP | 2000-030693 A | 1/2000 |
| JP | 2004-253169 A | 9/2004 |
| JP | 2008234872 A | 10/2008 |
| JP | 5002872 B2 | 8/2012 |
| KR | 1020100099668 | 9/2010 |
| KR | 10-2016-0074236 A | 6/2016 |
| WO | 2002103824 | 12/2002 |
| WO | 2005114768 | 12/2005 |

(Continued)

OTHER PUBLICATIONS

Tian, Jun et al., "High-rate and cycling-stable nickel-rich cathode materials with enhanced Li+ diffusion pathway", ACS Applied Materials & Interfaces, 2015 (published), vol. 8, No. 1, pp. 582-587.
Zhu, Jianxin et al., "Crystal growth of Li [Ni1/3Co1/3Mn1/3]O2 as a cathode material for high-performance lithium ion batteries", Crystal Growth & Design, 2012, vol. 12 No. 3, pp. 1118-1123.
Huang, Liang et al., "Nickel-cobalt hydroxide nanosheets coated on NiCo2O4 nanowires grown on carbon fiber paper for high-performance pseudocapacitors", Nano Letters, 2013, vol. 13, No. 7, pp. 3135-3139.
English machine translation of CN107591519.
Lim, et al., Advanced functional Materials, 2015; vol. 25, pp. 4673-4680.

(Continued)

*Primary Examiner* — Steven J Bos
(74) *Attorney, Agent, or Firm* — Dinsmore & Shohl LLP; Weston R. Gould

(57) ABSTRACT

Provided are electrochemically active secondary particles that provide excellent capacity and improved cycle life. The particles are characterized by a plurality of nanocrystals with small average crystallite size. The reduced crystallite size reduces impedance generation during cycling thereby improving capacity and cycle life. Also provided are methods of forming electrochemically active materials, as well as electrodes and electrochemical cells employing the secondary particles.

18 Claims, 4 Drawing Sheets

(56) References Cited

FOREIGN PATENT DOCUMENTS

WO         2015/053357 A1     4/2015
WO         2017/189887 A1    11/2017

OTHER PUBLICATIONS

Zuo, et al., Journal of Alloys and compounds, 2017; vol. 706, pp. 24-40.
Kim, et al., Nano Letters, 2015; vol. 15, pp. 2111-2119.
Moses, et al., Applied Surface Science, 2007; vol. 253, No. 10, pp. 4782-4791.
Li, et al., Journal of Alloys and Compounds, 2008; vol. 457, pp. L1-L5.
Lin, et al., Nature Communications, 2014; vol. 5, No. 3529, pp. 1-9.
Kim, et al., Energy Environ. Sci., 2018; vol. 11, pp. 1449-1459.
Lee, et al., Journal of Power Sources, 2015; vol. 273, pp. 663-669.
Jo, et al., Nano Research, 2015; vol. 8, No. 5, pp. 1464-1479.
Zheng, et al., Journal of The Electrochemical Society, 2011; vol. 158, pp. A357-A362.
Wantanabe, et al., Journal of Power Sources, 2014; vol. 258, pp. 210-217.
Kim, et al., Electrochemical and Solid State Letters, 2006; vol. 9, No. 1, pp. A19-A23.
Yan, et al., Nature Communications, 2017; vol. 8, No. 14101, pp. 1-9.
Kim, et al., Journal of Power Sources, 2006; vol. 159, pp. 1328-1333.
Kim, et al., Advanced Materials, 2016; 28:4705-4712.
K. Lee and K. Kim, Journal of the electrochemical Society, 2000; vol. 145, No. 5, pp. 1709-1717.
Yang, et al., Journal of Power sources, 2016; vol. 331, pp. 487-494.

\* cited by examiner

NANOCRYSTALS OF POLYCRYSTALLINE LAYERED LITHIUM NICKEL METAL OXIDES

CROSS-REFERENCE TO RELATED APPLICATIONS

This application is a continuation of U.S. patent application Ser. No. 16/096,403, filed Oct. 25, 2018, and which is a U.S. National Phase Application under 35 U.S.C. § 371 of international application PCT/US2017/029913 filed Apr. 27, 2017, and which claims priority of U.S. Provisional Patent Application Ser. No. 62/328,447 filed Apr. 27, 2016, the disclosure of each of which is incorporated herein by reference.

FIELD

Disclosed is polycrystalline metal oxide particle, methods of manufacture thereof, and electrochemical cells or batteries comprising the same.

BACKGROUND

Layered structure lithium nickelate ($LiNiO_2$)-based materials have been developed for Lithium-ion battery cathodes because they generally have lower cost, higher capacity and higher rate capability than the historically predominant $LiCoO_2$ cathode material. However, pure $LiNiO_2$ materials exhibit poor electrochemical stability and cycling performance. To address this, non-nickel, elemental additives have been formulated into $LiNiO_2$ that stabilize the structure improving the cycling performance, but typically at the expense of discharge capacity. As demands for energy density have increased, research has focused on optimizing and reducing these non-nickel additives to capture the capacity of high Ni materials while at the same time maintaining cycling performance.

As such, new materials are needed to address the demands for high capacity materials with long cycle life. The materials provided herein and methods of forming such materials address this need by maintaining high capacity over a long cycle life.

SUMMARY

The following summary is provided to facilitate an understanding of some of the innovative features unique to the present disclosure and is not intended to be a full description. A full appreciation of the various aspects of the disclosure can be gained by taking the entire specification, claims, drawings, and abstract as a whole.

Provided are electrochemically active polycrystalline particles that when incorporated into a lithium ion cell display excellent capacity and improved cycle life. The electrochemically active polycrystalline particle includes a plurality of nanocrystals where the plurality of nanocrystals includes a first composition defined by $Li_{1+x}MO_{2+y}$. Optionally, x is greater than or equal to −0.1 and less than or equal to 0.3. Optionally, y is greater than or equal to −0.3 and less than or equal to 0.3. Optionally, M comprises nickel at greater than or equal to 10 atomic percent. The plurality of nanocrystals having an average crystallite size of less than or equal to 85 nanometers as determined by x-ray diffraction (XRD) for base particles, or having an average crystallite size of less than or equal to 105 nanometers as determined by XRD for coated or grain boundary enriched particles. In some aspects, M further includes one or more elements selected from the group consisting of Al, Mg, Co, Mn, Ca, Sr, Zn, Ti, Zr, Cr, Mo, Fe, V, Si, Ga and B.

Also provided are methods of manufacturing an electrochemically active polycrystalline particle where the methods include providing a first mixture and calcining the first mixture. The first mixture (a "green body") optionally includes lithium hydroxide or its hydrate and a precursor hydroxide having nickel. Calcining the first mixture includes a maximum temperature of less than 700° C. to form a first material including a plurality of nanocrystals having a size of less than or equal to 85 nanometers. A method optionally further includes coating the particles and subjecting them to a second calcination to enrich grain boundaries between the nanocrystals/grain. For the coated particles the average crystallite size is 105 nm or less.

The resulting particles and methods achieve the objects by providing materials the produce electrochemical cells with excellent capacity and improved cycle life relative to particles with larger crystals.

BRIEF DESCRIPTION OF THE DRAWINGS

The aspects set forth in the drawings are illustrative and exemplary in nature and not intended to limit the subject matter defined by the claims. The following detailed description of the illustrative aspects can be understood when read in conjunction with the following drawings, where like structure is indicated with like reference numerals and in which:

DETAILED DESCRIPTION

Figure 1:
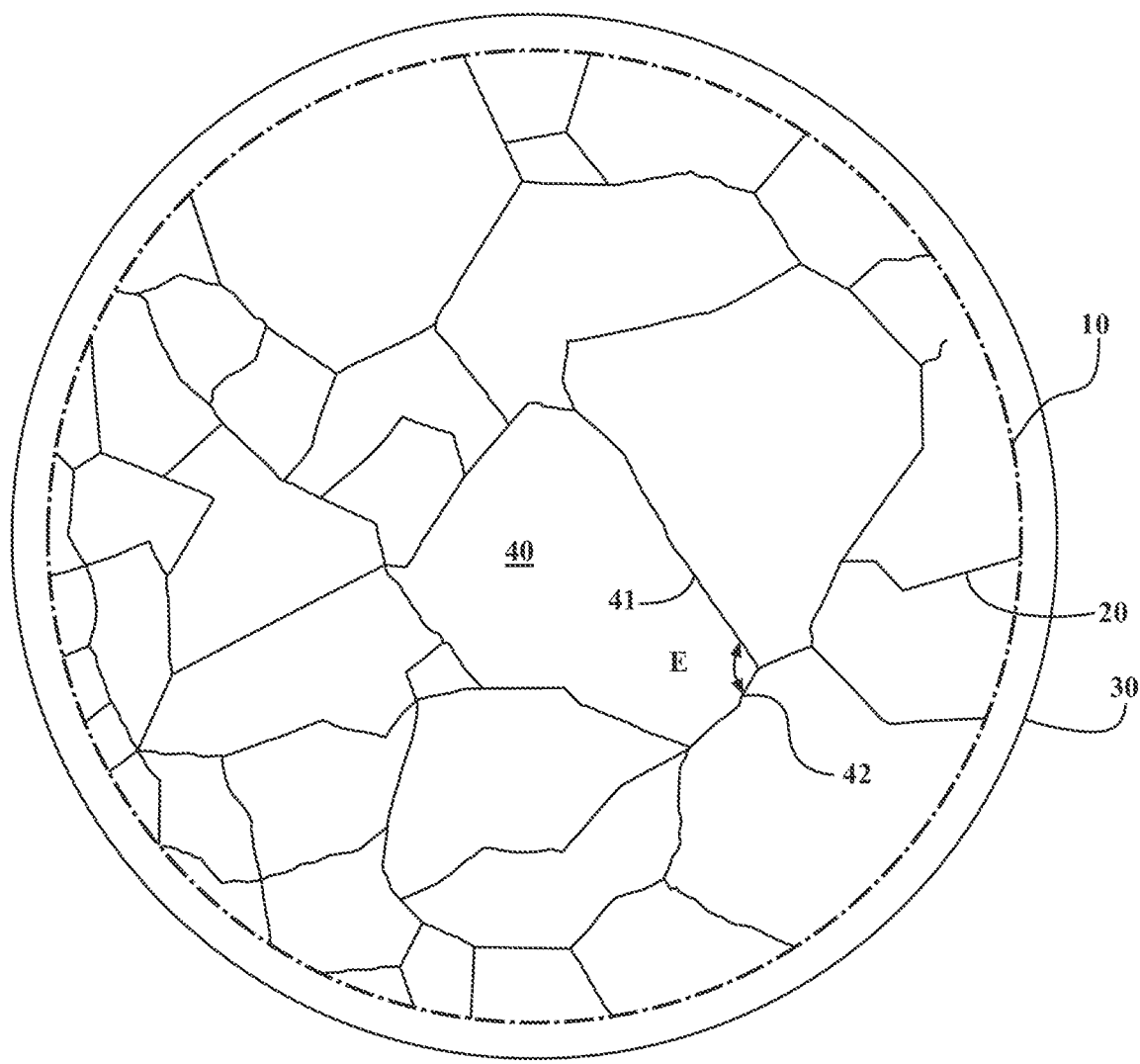
FIG. 1 is a schematic perspective view of a cross-section of electrochemically active polycrystalline particle according to one or more aspects described herein.

The following description of particular aspect(s) is merely exemplary in nature and is in no way intended to limit the scope of the disclosure, its application, or uses, which may, of course, vary. The materials and processes are described with relation to the non-limiting definitions and terminology included herein. These definitions and terminology are not designed to function as a limitation on the scope or practice of the disclosure, but are presented for illustrative and descriptive purposes only. While the processes or compositions are described as an order of individual steps or using specific materials, it is appreciated that steps or materials may be interchangeable such that the description of the invention may include multiple parts or steps arranged in many ways as is readily appreciated by one of skill in the art.

The invention now will be described more fully hereinafter with reference to the accompanying drawings, in which various aspects are shown. This invention may, however, be embodied in many different forms, and should not be construed as limited to the aspects set forth herein. Rather, these aspects are provided so that this disclosure will be thorough and complete, and will fully convey the scope of the invention to those skilled in the art. Like reference numerals refer to like elements throughout.

It will be understood that when an element is referred to as being "on" another element, it can be directly on the other element, or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, unless specified otherwise, "a first element," "component," "region," "layer," or "section" discussed below could be termed a second (or other) element, component, region, layer, or section without departing from the teachings herein.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

Unless otherwise defined, all terms (including technical and scientific terms) used herein have the same meaning as commonly understood by one of ordinary skill in the art to which this disclosure belongs. It will be further understood that terms such as those defined in commonly used dictionaries, should be interpreted as having a meaning that is consistent with their meaning in the context of the relevant art and the present disclosure, and will not be interpreted in an idealized or overly formal sense unless expressly so defined herein.

Ni-based layered materials of the $LiMO_2$ type are dense, polycrystalline agglomerates of primary crystals. These are typically made using standard solid-state processes at temperatures in the range of 700° C. to 900° C. starting from a variety of precursor materials. Precursor materials are typically transition metal hydroxides ($M(OH)_2$), lithium precursors (e.g., LiOH or $Li_2CO_3$), or inorganic precursors for other dopants (e.g., hydroxides, carbonates, nitrates). During heating of the precursor mixture, polycrystalline $LiMO_2$ is formed along with the expulsion of gases such as $H_2O$, $CO_2$ or $NO_2$. Simultaneously, the primary crystals in the polycrystalline material 'sinter' into larger primary crystals. The rate of crystal growth during the high-temperature synthesis increases dramatically with an increase in temperature. This effect has fundamental, thermodynamic explanations and is expected; however, the inventors found that the impact on cycling performance is negative.

During investigation, the inventors found that larger primary crystals tend to increase the rate of impedance growth in the cathode during repeated charge/discharge operation (cycling) of the Li-ion battery. The power delivery capability of the Li-ion battery reduces with an increase in the impedance of the cathode, and hence is undesirable for normal battery operation. There are multiple possible explanations for the faster rate of impedance growth with larger crystals. For example, it is known that with repeated charge/discharge cycling, the surface of the primary crystals undergoes damage causing an increase in the resistance to lithium transport (i.e., an increase in impedance) into the crystal from the crystal grain boundary. For a given battery operating current, the lithium flux or the current per unit surface of the crystal will be higher for the larger crystals than the smaller crystals (i.e., areal current density). Even if the resistance increase per unit surface area of the crystal is the same for smaller and larger crystals, the higher areal current density for the larger crystals results in a higher voltage drop, which is manifest as a higher impedance.

However, active materials that displays a combination of high initial discharge capacity and low impedance growth during cycling are difficult to make synthetically. This becomes especially true when the nickel component of M approaches 90% and higher. At such levels of nickel, the rate of crystal growth at synthetic temperatures required to obtain a high degree of crystal order is very high. Primary crystals with a size substantially exceeding 100 nm, often on the order of several hundred nanometers (nm) or more are typical (as determined from X-ray diffraction) with previously known synthetic conditions.

Accordingly, this disclosure addresses the aforementioned difficulties by providing positive electrode (cathode) active materials for Li-ion batteries with nanocrystals in order to reduce the rate of impedance growth during charge/discharge cycling of the battery. Provided are a variety of methods for achieving high discharge capacity cathode active material having an average crystallite size of less than or equal to 85 nm for base particle material and less than or equal to 105 nm for grain boundary enriched material (both as determined by XRD) in nickel containing formulations.

The polycrystalline layered-structure lithiated metal oxides having nano-crystalline structure as described herein exhibit enhanced electrochemical performance and stability. The nano-crystalline compositions prevent the performance degradation of electrochemically cycled Ni-containing polycrystalline $LiMO_2$-based materials, while maintaining other desirable end-use article properties, e.g., electrochemical capacity of rechargeable lithium-ion cathodes made from such nano-crystalline layered metal oxides by reducing the rate of impedance growth during electrochemical cycling. Such nano-crystalline compositions may be readily manufactured by calcining a green body formulation including a LiOH and a precursor hydroxide or carbonate to a maximum temperature of less than 700° C.

As such, provided are compositions, systems, and methods of making and using polycrystalline layered-structure lithiated metal oxides having nano-crystalline structure in lithium-ion secondary cells as the means of achieving high initial discharge capacity and low impedance growth during cycling, thereby overcoming the above-described challenges of achieving nanocrystals having an average size of less than or equal to 105 nm in high-nickel formulations that also have high discharge capacity (e.g., >205 mAh/g at C/20).

Throughout this disclosure reference is made to the crystallite size of nanocrystals within the polycrystalline materials. These sizes are as determined by XRD methods, optionally by powder X-ray diffraction patterns collected from a continuous scan between 12 and 120 degrees in 2-theta at 0.75 degrees/min using an automated Shimadzu XRD-6000 diffractometer with a Cu X-ray tube. As used herein, the term "nanocrystal" refers to a crystallite size of 85 nm or lower for a base material and 105 nm or lower for a grain boundary enriched material at relatively low Co enrichment. It was found that during a coating step to enrich the grain boundaries with cobalt, that crystallite size may increase slightly due to high temperature exposure in calcination. In such circumstances, the measured crystallite size by XRD is increased resulting in a material with a measured crystallite size of 105 nm or below.

FIG. 1 depicts (not to scale) a schematic of an exemplary polycrystalline layered-structure lithiated metal oxides having nano-crystalline structure. The material includes a particle comprising a plurality of nanocrystals 10 each comprising a first composition. The particle with a plurality of nanocrystals may be referred to as a secondary particle. The particles as provided herein are uniquely tailored to have nanocrystals far smaller than those thought suitable in the art. For example, the particles as provided herein include a plurality of nanocrystals with an average crystallite size of 85 nanometers (nm) or less for a base material. The reduced crystallite size provided for reduced impedance growth during cycling improving performance and cycle life of a cell incorporating the particles as a component of a cathode. FIG. 1 further illustrates a particular set of aspects wherein the particles may further include a grain boundary 20 formed of or including a second composition, wherein a concentration of cobalt, for example, in the grain boundary is greater than a concentration of cobalt, for example, in the nanocrystal. The grain boundary enriched particles as provided herein include a plurality of nanocrystals with an average crystallite size of 105 nanometers (nm). Optionally, also as depicted in FIG. 1, an layer 30 may be disposed on an outer surface of the secondary particle to provide a coated secondary particle.

In some aspects of the presently provided particles, the first composition includes polycrystalline layered-structure lithiated metal oxides defined by composition $Li_{1+x}MO_{2+y}$ and optionally a cell or battery formed therefrom, where $-0.1 \leq x \leq 0.3$ and $-0.3 \leq y \leq 0.3$. In some aspects, x is $-0.1$, optionally 0, optionally 0.1, optionally 0.2, or optionally 0.3. Optionally, x is greater than or equal to $-0.10, -0.09, -0.08, -0.07, -0.06, -0.05, -0.04, -0.03, -0.02, -0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29,$ or $0.30$. In some aspects, y is $-0.3$, optionally $-0.2$, optionally $-0.1$, optionally 0, optionally 0.1, optionally 0.2, or optionally 0.3. Optionally, y is greater than or equal to $-0.30, -0.29, -0.28, -0.27, -0.26, -0.25, -0.24, -0.23, -0.22, -0.21, -0.20, -0.19, -0.18, -0.17, -0.16, -0.15, -0.14, -0.13, -0.12, -0.11, -0.10, -0.09, -0.08, -0.07, -0.06, -0.05, -0.04, -0.03, -0.02, -0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29,$ or $0.3$.

It is appreciated that in some aspects Li need not be exclusively Li, but may be partially substituted with one or more elements selected from the group consisting of Mg, Na, K, and Ca. The one or more elements substituting Li, are optionally present at 10 atomic % or less, optionally 5 atomic % or less, optionally 3 atomic % or less, optionally no greater than 2 atomic percent.

M as provided in the first composition includes Ni. The amount of Ni is optionally from 10 atomic percent to 99 atomic percent (at %) of M. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 98 at %, or 99 at %.

In some aspects, M is Ni and one or more additional elements. The additional elements are optionally metals. Optionally, an additional element may include or be one or more of Al, Mg, Co, Mn, Ca, Sr, Zn, Ti, Zr, Y, Cr, Mo, Fe, V, Si, Ga, or B. In particular aspects, the additional element may include Mg, Co, Al, or a combination thereof. Optionally, the additional element may be Mg, Al, V, Ti, B, Zr, or Mn, or a combination thereof. Optionally, the additional element consists of Mg, Al, V, Ti, B, Zr, or Mn. Optionally, the additional element consists of Mg, Co, and Al. Optionally, the additional element consists of Mg, Co, Al, and Zr. Optionally, the additional element consists of Ca, Co, and Al. In some aspects, the additional element is Mn or Mg, or both Mn and Mg.

An additional element of the first composition may be present in an amount of about 1 to about 90 at %, specifically about 5 to about 80 at %, more specifically about 10 to about 70 at % of the first composition. Optionally, the additional element may be present in an amount of about 1 to about 20 at %, specifically about 2 to about 18 at %, more specifically about 4 to about 16 at %, of the first composition. In some illustrative examples, M is about 75-99 at % Ni, 3-15 at % Co, 0-15 at % Mn, and 0-10 at % additional elements.

Within the polycrystalline material, each nanocrystal may have any suitable shape, which can be the same or different within each particle. Further, the shape of each nanocrystal can be the same or different in different particles. Because of its crystalline nature, the nanocrystal may be faceted, the nanocrystal may have a plurality of flat surfaces, and a shape of the nanocrystal may approximate a geometric shape. In some aspects, the nanocrystal may be fused with neighboring nanocrystals with mismatched crystal planes. The nanocrystal may have a rectilinear shape, and when viewed in cross-section, a portion of or an entirety of the nanocrystal may be rectilinear. The nanocrystal may be square, hexagonal, rectangular, triangular, or a combination thereof.

In some aspects referring to a base material that is not enriched in the grain boundary, the average crystallite size of the nanocrystals is less than or equal to about 85 nm. Optionally, the average crystallite size of the nanocrystals is less than or equal to about 80 nm. Optionally, the average crystallite size of the nanocrystals is less than or equal to about 75 nm. Optionally, the average crystallite size of the nanocrystals is less than or equal to about 70 nm. Optionally, the average crystallite size of the nanocrystals is less than or equal to about 65 nm. Optionally, the average crystallite size of the nanocrystals is less than or equal to about 60 nm. Optionally, the average crystallite size of the nanocrystals is less than or equal to about 55 nm. Optionally, the average crystallite size of the nanocrystals is less than or equal to about 50 nm.

In some aspects referring to a base material that is not enriched in the grain boundary, the average crystallite size of the nanocrystals is greater than or equal to 50 nm to less than or equal to about 85 nm. Optionally, the average crystallite size of the nanocrystals is greater than or equal to about 50 nm to less than or equal to about 80 nm. Optionally, the average crystallite size of the nanocrystals is greater than or equal to about 50 nm to less than or equal to about 70 nm. Optionally, the average crystallite size of the nanocrystals is greater than or equal to about 55 nm to less than or equal to about 70 nm.

In other aspects referring to a base material that is not enriched in the grain boundary, the average crystallite size of the nanocrystals is less than or equal to about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, about 70 nm, about 69 nm, about 68 nm, about 67 nm, about 66 nm, about 65 nm, about 64 nm, about 63 nm, about 62 nm, about 61 nm, about 60 nm, about 59 nm, about 58 nm, about 57 nm, about 56 nm, about 55 nm, about 54 nm, about 53 nm, about 52 nm, about 51 nm, or about 50 nm.

As measured by XRD for a coated material comprising secondary particles with metal enriched grain boundaries such as a Co enriched grain boundaries, the average crystallite size of the nanocrystals is less than or equal to about 105 nm. Optionally, the average crystallite size of the nanocrystals is less than or equal to about 100 nm. Optionally, the average crystallite size of the nanocrystals is less than or equal to about 95 nm. Optionally, the average crystallite size of the nanocrystals is less than or equal to about 90 nm. Optionally, the average crystallite size of the nanocrystals is less than or equal to about 85 nm. Optionally, the average crystallite size of the nanocrystals is less than or equal to about 80 nm. Optionally, the average crystallite size of the nanocrystals is less than or equal to about 75 nm. Optionally, the average crystallite size of the nanocrystals is less than or equal to about 70 nm.

In some aspects referring to grain boundary enriched material, the average crystallite size of the nanocrystals is greater than or equal to 70 nm to less than or equal to about 105 nm. Optionally, the average crystallite size of the nanocrystals is greater than or equal to about 70 nm to less than or equal to about 100 nm. Optionally, the average crystallite size of the nanocrystals is greater than or equal to about 70 nm to less than or equal to about 90 nm. Optionally, the average crystallite size of the nanocrystals is greater than or equal to about 75 nm to less than or equal to about 90 nm.

In other aspects referring to a grain boundary enriched material, the average crystallite size of the nanocrystals is less than or equal to about 105 nm, about 104 nm, about 103 nm, about 102 nm, about 101 nm, about 100 nm, about 99 nm, about 98 nm, about 97 nm, about 96 nm, about 95 nm, about 94 nm, about 93 nm, about 92 nm, about 91 nm, about 90 nm, about 89 nm, about 88 nm, about 87 nm, about 86 nm, about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, or about 70 nm.

As compared to a base particle, a grain boundary enriched particle includes Co enrichment in the grain boundary relative to the nanocrystal. The presence of Co enrichment can artificially suppress the measurement of nanocrystal size when measured using XRD with increased suppression in XRD measurement at increasing enrichment levels of Co in the grain boundaries. For example, the crystallite size for a material where 6 at % Co (relative to the metal content of the base material) is added to the coating to create a grain boundary-enriched material (6 at % Co enrichment) is smaller than the crystallite size for a material with 4 at % Co enrichment. As such, for coated particles, the measurement of nanocrystal size is optionally at a particular enrichment level of Co. In some aspects, the nanocrystal size at an enrichment of 4 at % Co is 105 nm or lower or any other level as in the forgoing paragraphs. Optionally, at a 6 at % enrichment of Co in the grain boundary the nanocrystal size is 80 nm or less or any other value as otherwise described herein less than 80 nm.

In some aspects, the grain boundaries are enriched with Co to 4 at % and the average crystallite size of the nanocrystals is less than or equal to about 105 nm, about 104 nm, about 103 nm, about 102 nm, about 101 nm, about 100 nm, about 99 nm, about 98 nm, about 97 nm, about 96 nm, about 95 nm, about 94 nm, about 93 nm, about 92 nm, about 91 nm, about 90 nm, about 89 nm, about 88 nm, about 87 nm, about 86 nm, about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, or about 70 nm.

In some aspects, the grain boundary is enriched with about 6 at % cobalt and the average crystallite size of the nanocrystals is less than or equal to about 82 nm, about 81 nm, about 80 nm, about 79 nm, about 78 nm, about 77 nm, about 76 nm, about 75 nm, about 74 nm, about 73 nm, about 72 nm, about 71 nm, about 70 nm, about 69 nm, about 68 nm, about 67 nm, about 66 nm, about 65 nm, about 64 nm, about 63 nm, about 62 nm, about 61 nm, about 60 nm, about 59 nm, about 58 nm, about 57 nm, about 56 nm, about 55 nm, about 54 nm, about 53 nm, about 52 nm, about 51 nm, or about 50 nm.

In some aspects, the grain boundary is enriched with 1 at % Co, 2 at % Co, 3 at % Co, 4 at % Co, 5 at % Co, 6 at % Co, 7 at % Co, 8 at % Co, 9 at % Co, 10 at % Co.

One additional advantage of the particles as provided herein according to some aspects is an increased atomic lattice order of the nanocrystals in the material. The combination of nanocrystals with improved structural order may produce further enhancement in cycle life and reduction in impedance growth during cycling of cells incorporating the particles as the or a component of the cathode. Order of nanocrystals may be obtained by measuring the relative amount(s) of $Ni^{2+}$ ions occupying the Li-site in the $LiNiO_2$ R-3m layered crystal structure and the relative z-position of the oxygen atom. Note that $Ni^{2+}$ is meant to represent all possible elements that are heavier than $Li^+$ with larger electron density that can scatter x-rays that can occupy the Li site (e.g. Ca, Mg, Ni, Co, Al, etc.) Using these parameters, the $Ni^{2+}$ value of less than or equal to 3.5 at % Ni is considered to have suitable order to, in combination with crystallite size, product the improved electrochemical performance of the materials. It was found that by preparing grain boundary enriched particles as provided herein that the average crystallite size of 105 nm or below could be formed while still maintaining the $Ni^{2+}$ relative amount in the Li-site of the crystal structure of 3.5 at % Ni or below. In some aspects of either a particle with or without an enriched grain boundary, the relative $Ni^{2+}$ in the Li-sites of the crystal structure is at or below 3.4 at % Ni, optionally 3.3 at % Ni, optionally 3.2 at % Ni, optionally 3.1 at % Ni, optionally 3.0 at % Ni, optionally 2.9 at % Ni, optionally 2.8 at % Ni, optionally 2.7 at % Ni, optionally 2.6 at % Ni, optionally 2.5 at % Ni, optionally 2.4 at % Ni, optionally 2.3 at % Ni, optionally 2.2 at % Ni, optionally 2.1 at % Ni, optionally 2.0 at % Ni, optionally 1.9 at % Ni, optionally 1.8 at % Ni, optionally, 1.7 at % Ni, optionally 1.6 at % Ni, optionally 1.5 at % Ni, optionally 1.4 at % Ni. In some aspects, following a primary calcination as provided herein the $Ni^{2+}$ relative amount in the Li-site of the crystal structure is less than or equal to 1.6 at % Ni, optionally from 1.4 at % Ni to 1.6 at % Ni, or any value or range therebetween.

In particular aspects, a particle has an enriched grain boundary, optionally a Co enriched grain boundary where the atomic percentage of Co in the grain boundary is higher than the atomic percentage of Co in the nanocrystals. Referring back to FIG. 1 as an exemplary illustration, the grain boundary 41, 42 is between adjacent nanocrystals/grains 40, is on a surface of the nanocrystal/grains 40, and comprises the second composition. As second composition may be as described in U.S. Pat. Nos. 9,391,317 and 9,209,455 and may be formed substantially as described therein. The second composition optionally has the layered α-$NaFeO_2$-type structure, a cubic structure, or a combination thereof. As noted above, a concentration of cobalt in the grain boundaries may be greater than a concentration of cobalt in the nanocrystals. An aspect in which the grain boundaries have the layered α-$NaFeO_2$-type structure is specifically mentioned.

The second composition of the grain boundaries optionally includes lithiated metal oxides defined by composition $Li_{1+x}MO_{2+y}$, where $-0.9 \leq x \leq 0.3$ and $-0.3 \leq y \leq 0.3$. In some aspects, x is −0.1, optionally 0, optionally 0.1, optionally 0.2, or optionally 0.3. Optionally, x is greater than or equal to −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is −0.3, optionally −0.2, optionally −0.1, optionally 0, optionally 0.1, optionally 0.2, or optionally 0.3. Optionally, y is greater than or equal to −0.30, −0.29, −0.28, −0.27, −0.26, −0.25, −0.24, −0.23, −0.22, −0.21, −0.20, −0.19, −0.18, −0.17, −0.16, −0.15, −0.14, −0.13, −0.12, −0.11, −0.10, −0.09, −0.08, −0.07, −0.06, −0.05, −0.04, −0.03, −0.02, −0.01, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3.

M as provided in the second composition includes Ni. The amount of Ni is optionally from 10 atomic percent to 99 atomic percent (at %) of M. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 98 at %, or 99 at %.

In some aspects, M in a second composition is one or more Ni substituting elements. The Ni substituting elements are optionally metals. Optionally, a substituting element may include or be one or more of Al, Mg, Co, Mn, Ca, Sr, Zn, Ti, Zr, Y, Cr, Mo, Fe, V, Si, Ga, or B. In particular aspects, the substituting element may include Mg, Co, Al, or a combination thereof.

A substitution element of the second composition may be present in an amount of about 1 to about 90 at %, specifically about 5 to about 80 at %, more specifically about 10 to about 70 at % of the first composition. Optionally, the additional element may be present in an amount of about 1 to about 20 at %, specifically about 2 to about 18 at %, more specifically about 4 to about 16 at %, of the first composition.

The shape of the grain boundary is defined by the shape of the grain which may represent one or more fused nanocrystal(s) adjacent the grain boundary. The shape of the grain boundary may approximate a geometric shape. The grain boundary may have a rectilinear shape, and when viewed in cross-section the grain boundary may be rectilinear. The grain boundary may be square, hexagonal, rectangular, triangular, or a combination thereof.

A direction of a surface of the grain boundary corresponds to a direction of a surface of the adjacent nanocrystal. Also, as shown in FIG. 1, the surface of the grain boundary and the surface of the nanocrystal may have any of a variety of orientations relative to an outer surface of the particle. Thus, the direction of the surface of the nanocrystal and the direction of the surface of the grain boundary may be parallel and be different than a direction of a nearest outer surface of the secondary particle. In some aspects, a direction of a tangent of the nearest outer surface of the particle is different than the direction of the surface of the grain boundary and the direction of the surface of the adjacent particle.

As is also shown in FIG. 1, the grain boundaries may intersect to form an angle therebetween. In some aspects, disposed on adjacent faces of a nanocrystal/grain 40 is a first grain boundary 41 and second grain boundary 42. The first grain boundary 41 and the second grain boundary 42 intersect at an angle E. The angle E may be defined by the shape of the nanocrystal on which the first grain boundary 41 and the second grain boundary 42 are disposed. Generally, a shape of a nanocrystal is influenced by a crystal structure of the nanocrystal. While not wanting to be bound by theory, it is understood that because the crystal structure of the first composition governs the shape of the nanocrystal, the angle between the first and second grain boundaries 41, 42 is influenced by the crystal structure of the first composition. The first and second grain boundaries 41, 42 may intersect at any angle, specifically an angle of about 10 to about 170 degrees, specifically about 20 to about 160 degrees, more specifically about 30 to about 150 degrees, so long as the angle is consistent with the crystal structure of the first composition, which optionally has the layered α-$NaFeO_2$-type structure.

The particle may be prepared by synthesizing a green body from at least two components, optionally in powder form. At least two components may include micronized (or non-micronized) lithium hydroxide or its hydrate and a precursor hydroxide(s) comprising nickel, and or one or more other elements. It is appreciated that the final overall composition (although not necessarily distribution) of the elements in the final particle may be adjusted by increasing or decreasing the relative amounts of the precursor materials in the formation of the green body. In some aspects, the lithium hydroxide or its hydrate are micronized. The two or more powders forming the green body may be combined and shaken on a paint shaker to thoroughly mix the precursors. The green body is then calcined with a controlled air atmosphere to a maximum temperature whereby water and $CO_2$ are minimized. Calcining is optionally preformed following a heating curve to provide the desired average crystallite size. The calcined product may then be processed to form a free-flowing powder.

In some aspects, the precursor hydroxide may be a mixed metal hydroxide. In some aspects, the mixed metal hydroxide may include a metal composition of Ni, Co, and Mg.

Optionally, the mixed metal hydroxide includes as a metal component 80-100 at % Ni, 0-15 at % Co, and 0-5 at % Mg. Optionally, the metals of the mixed metal hydroxide is 92 at % Ni and 8 at % Co. Optionally, the metals of the mixed metal hydroxide is 90 at % Ni, 8 at % Co, and 2 at % Mg. Optionally, the metals of the mixed metal hydroxide is 89 at % Ni, 8 at % Co, 3 at % Mg. Optionally, the metals of the mixed metal hydroxide is 91 at % Ni, 8 at % Co, and 1 at % Mg. Optionally, the metal of the mixed metal hydroxide is 100 at % Ni. For example, precursor hydroxide may be made by a precursor supplier, such as Hunan Brunp Recycling Technology Co. Ltd., using standard methods for preparing nickel-hydroxide based materials.

It was found that by reducing the maximum temperature of a first calcination a particulate material with relatively small crystal (i.e., nanocrystals) could be prepared. As such, in a first calcination, a maximum temperature may be less than 700° C. Optionally, the maximum temperature may be about 680 degrees Celsius or less. Optionally, the maximum temperature may be about 660 degrees Celsius or less. Optionally, the maximum temperature may be about 640 degrees Celsius or less. In yet other aspects, the maximum temperature may be less than about 700 degrees Celsius, about 695 degrees Celsius, about 690 degrees Celsius, about 685 degrees Celsius, about 680 degrees Celsius, about 675 degrees Celsius, about 670 degrees Celsius, about 665 degree Celsius, about 660 degrees Celsius, about 655 degrees Celsius, about 650 degrees Celsius, about 645 degrees Celsius, or about 640 degrees Celsius. The dwell time at the maximum temperature is optionally less than 10 hours. Optionally, the dwell time at the maximum temperature is less than or equal to 8 hours; optionally less than or equal to 7 hours; optionally less than or equal to 6 hours; optionally less than or equal to 5 hours; optionally less than or equal to 4 hours; optionally less than or equal to 3 hours; optionally less than or equal to 2 hours.

It was found that in some aspects reducing the temperature below a minimum temperature reduced the electrochemical improvements observed. As such, for a first calcination a maximum temperature in some aspects is at least about 640 degrees Celsius, optionally about 645 degrees Celsius, optionally about 650 degrees Celsius. In some aspects, a maximum temperature must be reached and such maximum temperature is optionally from about 640 degrees Celsius to about 695 degrees Celsius, optionally from about 645 degrees Celsius to about 695 degrees Celsius, optionally from about 650 degrees Celsius to about 695 degrees Celsius, optionally from about 655 degrees Celsius to about 695 degrees Celsius, optionally from about 645 degrees Celsius to about 680 degrees Celsius, optionally from about 650 degrees Celsius to about 680 degrees Celsius, optionally from about 655 degrees Celsius to about 680 degrees Celsius, optionally from about 660 degrees Celsius to about 680 degrees Celsius.

In some aspects, the heating curve of the first calcination process follows a two ramp/dwell process followed by natural cooling to about 130 degrees Celsius whereupon the calcined material is subsequently processed. As an illustrative aspect, the first ramp/dwell may be from ambient (e.g. about 25 degrees Celsius) to 450 degrees Celsius at a rate of 5 degree Celsius per minute with a 2 hour hold at 450 degrees Celsius. Subsequently, the second ramp/dwell may be from 450 degrees Celsius to a maximum temperature at a rate of 2 degree Celsius per minute with a 6 hour hold at the maximum temperature.

After calcination, subsequent processing may include breaking up the calcined material with a mortar and pestle so that the resulting powder passes through a desired sieve, optionally a #35 sieve. The powder is optionally then jar milled in a 1 gallon jar with a 2 cm drum YSZ media for optionally 5 minutes or an adequate time such that the material may passes through optionally a #270 sieve.

In some aspects, the milled product may be coated, optionally in a method so as to result in enriched grain boundaries following a second calcination. A process of coating to enrich grain boundaries within a primary particle may be performed by methods or using compositions as illustrated in U.S. Pat. Nos. 9,391,317 and 9,209,455. The coating may optionally be applied by suspending the milled product in an aqueous slurry comprising an enrichment element, optionally cobalt, and lithium nitrate optionally at a temperature of 60 degrees Celsius. The slurry may then be spray dried to form a free-flowing powder which is then subjected to a second calcination optionally with a heating curve following a two ramp/dwell process. The first two ramp/dwell temperature profile may be from ambient (about 25 degree Celsius) to 450 degree Celsius and at a rate of 5 degree Celsius per minute with a 1 hour hold at 450 degrees Celsius. Subsequently, the second ramp/dwell may be from 450 degrees Celsius to a maximum temperature at a rate of 2 degree Celsius per minute with a 2 hour hold at the maximum temperature. In some aspects, the maximum temperature is about 700 degrees Celsius. In other aspects, the maximum temperature is about 725 degrees Celsius.

By combining a first calcination with a maximum temperature as described above with a coating by second calcination also as described above it was found that average crystallite size of 105 nm (XRD measurement) or less could be maintained while simultaneously maintaining the same sequential ordering of the materials with an $Ni^{2+}$ of 3.5 at % Ni or lower. Such a combination was found to result in additional cycle life and reduction in impedance growth significantly improving the electrochemical performance of the material. As such, it is appreciated that in some aspects, a particle includes a plurality of nanocrystals with a first composition including polycrystalline layered-structure lithiated metal oxides defined by composition $Li_{1+x}MO_{2+y}$ where $-0.1 \leq x \leq 0.3$ and $-0.3 \leq y \leq 0.3$. In some aspects x is $-0.1$, optionally 0, optionally 0.1, optionally 0.2, or optionally 0.3. Optionally x is greater than or equal to $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.30. In some aspects, y is $-0.3$, optionally $-0.2$, optionally $-0.1$, optionally 0, optionally 0.1, optionally 0.2, or optionally 0.3. Optionally, y is greater than or equal to $-0.30$, $-0.29$, $-0.28$, $-0.27$, $-0.26$, $-0.25$, $-0.24$, $-0.23$, $-0.22$, $-0.21$, $-0.20$, $-0.19$, $-0.18$, $-0.17$, $-0.16$, $-0.15$, $-0.14$, $-0.13$, $-0.12$, $-0.11$, $-0.10$, $-0.09$, $-0.08$, $-0.07$, $-0.06$, $-0.05$, $-0.04$, $-0.03$, $-0.02$, $-0.01$, 0.00, 0.01, 0.02, 0.03, 0.04, 0.05, 0.06, 0.07, 0.08, 0.09, 0.10, 0.11, 0.12, 0.13, 0.14, 0.15, 0.16, 0.17, 0.18, 0.19, 0.20, 0.21, 0.22, 0.23, 0.24, 0.25, 0.26, 0.27, 0.28, 0.29, or 0.3. The nanocrystals have an amount of Ni in the M element of 10 atomic percent to 99 atomic percent (at %) of the particle. Optionally, the Ni component of M is greater than or equal to 75 at %. Optionally, the Ni component of M is greater than or equal to 80 at %. Optionally, the Ni component of M is greater than or equal to 85 at %. Optionally, the Ni component of M is greater than or equal to 90 at %. Optionally, the Ni component of M is greater than or equal to 95 at %. Optionally, the Ni component of M is greater than or equal to 75 at %, 76 at %, 77 at %, 78 at %, 79 at %, 80 at %, 81 at %, 82 at %, 83 at %, 84 at %, 85 at %, 86 at %, 87 at %, 88 at %, 89 at %, 90 at %, 91 at %, 92 at %, 93 at %, 94 at %, 95 at %, 96 at %, 98 at %, or 99 at %. The M component may include one or more additional elements. The additional elements are optionally metals. Optionally, an additional element may include or be one or more of Al, Mg, Co, Mn, Ca, Sr, Zn, Ti, Zr, Y, Cr, Mo, Fe, V, Si, Ga, or B. In particular aspects, the additional element may include Mg, Co, Al, or a combination thereof. Optionally, the additional element may be Mg, Al, V, Ti, B, Zr, or Mn, or a combination thereof. Optionally, the additional element consists of Mg, Al, V, Ti, B, Zr, or Mn. In some aspects, the additional element is Mn or Mg, or both Mn and Mg. The additional element of the first composition may be present in an amount of about 1 to about 90 at %, specifically about 5 to about 80 at %, more specifically about 10 to about 70 at % of the first composition. Optionally, the additional element may be present in an amount of about 1 to about 20 at %, specifically about 2 to about 18 at %, more specifically about 4 to about 16 at %, of the first composition. In some illustrative examples, M is about 75-99 at % Ni, 3-15 at % Co, 0-15 at % Mn, and 0-10 at % additional elements. Also, the average crystallite size of the nanocrystals (as determined by X-ray diffraction methods described hereinabove) is less than or equal to about 105 nm. Optionally, the average crystallite size of the nanocrystals is less than or equal to about 100 nm. Optionally, the average crystallite size of the nanocrystals is less than or equal to about 95 nm. Optionally, the average crystallite size of the nanocrystals is less than or equal to about 90 nm. Optionally, the average crystallite size of the nanocrystals is less than or equal to about 85 nm. Optionally, the average crystallite size of the nanocrystals is less than or equal to about 80 nm. Optionally, the average crystallite size of the nanocrystals is less than or equal to about 75 nm. Optionally, the average crystallite size of the nanocrystals is less than or equal to about 70 nm. In some aspects, the average crystallite size of the nanocrystals is greater than or equal to 70 nm to less than or equal to about 105 nm. Optionally, the average crystallite size of the nanocrystals is greater than or equal to about 70 nm to less than or equal to about 100 nm. Optionally, the average crystallite size of the nanocrystals is greater than or equal to about 70 nm to less than or equal to about 105 nm. Optionally, the average crystallite size of the nanocrystals is greater than or equal to about 75 nm to less than or equal to about 100 nm. In other aspects, the average crystallite size of the nanocrystals is less than or equal to about 105 nm, about 104 nm, about 103 nm, about 102 nm, about 101 nm, about 100 nm, about 99 nm, about 98 nm, about 97 nm, about 96 nm, about 95 nm, about 94 nm, about 93 nm, about 92 nm, about 91 nm, about 90 nm, about 89 nm, about 88 nm, about 87 nm, about 86 nm, about 85 nm, about 84 nm, about 83 nm, about 82 nm, about 81 nm, about 80 nm, about 79 nm, about 78 nm, about 77 nm, about 76 nm, about 75 nm, about 74 nm, about 73 nm, about 72 nm, about 71 nm, or about 70 nm.

Optionally the particles further have atomic lattice ordered nanocrystals illustrated by the relative amount(s) of $Ni^{2+}$ ions occupying the Li-site in the $LiNiO_2$ R-3m layered crystal structure whereby the $Ni^{2+}$ value of less than or equal to 3.5%, optionally less than 3.2 at % Ni, optionally equal to or less than 2.5%. The atomic % Ni in the M element is optionally 75 at % to 99 at %, optionally 80 at % to 95 at %.

Optionally an outer layer illustrated at 30 in FIG. 1, such as a passivation layer or a protective layer, may be disposed on an outer surface of the particle. The outer layer may fully or partially cover the secondary particle. The layer may be amorphous or crystalline. The layer may comprise an oxide, a phosphate, a pyrophosphate, a fluorophosphate, a carbonate, a fluoride, an oxyfluoride, or a combination thereof, of an element such as Zr, Al, Ti, Al, B, Li, or Si, or a combination thereof. In some aspects the outer layer comprises a borate, an aluminate, a silicate, a fluoroaluminate, or a combination thereof. Optionally, the outer layer comprises a carbonate. Optionally, the outer layer comprises $ZrO_2$, $Al_2O_3$, $TiO_2$, $AlPO_4$, $AlF_3$, $B_2O_3$, $SiO_2$, $Li_2O$, $Li_2CO_3$, or a combination thereof. Optionally, an outer layer includes or is $AlPO_4$ or $Li_2CO_3$. The layer may be disposed by any process or technique that does not adversely affect the desirable properties of the particle. Representative methods include spray coating and immersion coating, for example.

Also provided are electrodes that include as a component of or the sole electrochemically active material a particle as described herein. A particle as provided herein is optionally included as an active component of a cathode. A cathode optionally includes a particle disclosed above as an active material, and may further include a conductive agent and/or a binder. The conductive agent may comprise any conductive agent that provides suitable properties and may be amorphous, crystalline, or a combination thereof. The conductive agent may include a carbon black, such as acetylene black or lamp black, a mesocarbon, graphite, carbon fiber, carbon nanotubes such as single wall carbon nanotubes or multi-wall carbon nanotubes, or a combination thereof. The binder may be any binder that provides suitable properties and may include polyvinylidene fluoride, a copolymer of polyvinylidene fluoride and hexafluoropropylene, poly(vinyl acetate), poly(vinyl butyral-co-vinyl alcohol-co vinyl acetate), poly(methylmethacrylate-co-ethyl acrylate), polyacrylonitrile, polyvinyl chloride-co-vinyl acetate, polyvinyl alcohol, poly(1-vinylpyrrolidone-co-vinyl acetate), cellulose acetate, polyvinylpyrrolidone, polyacrylate, polymethacrylate, polyolefin, polyurethane, polyvinyl ether, acrylonitrile-butadiene rubber, styrene-butadiene rubber, acrylonitrile-butadiene-styrene, tri-block polymer of sulfonated styrene/ethylene-butylene/styrene, polyethylene oxide, or a combination thereof, for example.

The cathode may be manufactured by combining the particle as described herein, the conductive agent, and the binder in a suitable ratio, e.g., about 80 to about 98 weight percent of the particle, about 2 to about 20 weight percent of the conductive agent, and about 2 to about 10 weight percent of the binder, based on a total weight of the particle, the conductive agent, and the binder combined. The particle, the conductive agent, and the binder may be suspended in a suitable solvent, such as N-methylpyrrolidinone, and disposed on a suitable substrate, such as aluminum foil, and dried in air. It is noted that the substrate and the solvent are presented for illustrative purposes alone. Other suitable substrates and solvents may be used or combined to form a cathode.

In some aspects, a cathode comprising a polycrystalline material having an average crystallite size of the nanocrystals that is less than or equal to about 85 nm or less than or equal to 105 nm depending on the presence or absence of enriched grain boundaries may exhibit an electrochemical discharge capacity of greater than 205 mAh/g at a C/20 rate when the electrode is charged to 4.3 V versus L-metal and discharged to 3.0 V. In yet another aspect, the cathode may exhibit an electrochemical discharge capacity of greater than 200 mAh/g at a C/20 rate when the electrode is charged to 4.3 V versus L-metal and discharged to 3.0 V. In yet another aspect, the cathode may exhibit an electrochemical discharge capacity of greater than 190 mAh/g at a C/20 rate when the electrode is charged to 4.3 V versus L-metal and discharged to 3.0 V. In yet another aspect, the cathode may exhibit an electrochemical discharge capacity of greater than 180 mAh/g at a C/20 rate when the electrode is charged to 4.3 V versus L-metal and discharged to 3.0 V. In yet another aspect, the cathode may exhibit an electrochemical discharge capacity of greater than 175 mAh/g at a C/20 rate when the electrode is charged to 4.3 V versus L-metal and discharged to 3.0 V. In yet another aspect, the cathode may exhibit an electrochemical discharge capacity of greater than 170 mAh/g at a C/20 rate when the electrode is charged to 4.3 V versus L-metal and discharged to 3.0 V.

A cathode as proved above when cycled with a lithium foil anode, a polyolefin separator and an electrolyte of 1 M $LiPF_6$ in 1/1/1 (vol.) EC/DMC/EMC with 1 wt. % VC in a 2025 coin cell optionally demonstrates a significantly reduced impedance growth. One measure of impedance growth is illustrated by charging the cell at 1C rate to 4.2V (CCCV) and discharging it to 2.7 V. The time spent at constant voltage during this characterization step may be used as a measure of impedance. The impedance measurement plotted against cycle number results in a curve with a defined slope. The impedance slope is lower when active particle material has a crystallite size or order as described herein relative to particles with a larger crystallite size (e.g. greater than 85 nm). In some aspects, the impedance slope is 0.025 or less, optionally 0.024 or less, optionally 0.023 or less, optionally 0.022 or less, optionally 0.021 or less, optionally 0.020 or less, optionally 0.019 or less, optionally 0.018 or less, optionally 0.017 or less, optionally 0.016 or less, optionally 0.015 or less.

Also disclosed is a battery comprising the cathode. The battery may be a lithium-ion battery, a lithium-polymer battery, or a lithium battery, for example. The battery may include a cathode, an anode, and a separator interposed between the cathode and the anode. The separator may be a microporous membrane, and may include a porous film including polypropylene, polyethylene, or a combination thereof, or may be a woven or non-woven material such a glass-fiber mat. The anode may include a coating on a current collector. The coating may include a suitable carbon, such as graphite, coke, a hard carbon, or a mesocarbon such as a mesocarbon microbead, for example. The current collector may be copper foil, for example.

The battery also includes an electrolyte that may contact the positive electrode (cathode), the negative electrode (anode), and the separator. The electrolyte may include an organic solvent and a lithium salt. The organic solvent may be a linear or cyclic carbonate. Representative organic solvents include ethylene carbonate, propylene carbonate, butylene carbonate, trifluoropropylene carbonate, ▢-butyrolactone, sulfolane, 1,2-dimethoxyethane, 1,2-diethoxyethane, tetrahydrofuran, 3-methyl-1,3-dioxolane, methyl acetate, ethyl acetate, methylpropionate, ethylpropionate, dimethyl carbonate, diethyl carbonate, ethyl methyl carbonate, dipropyl carbonate, methylpropyl carbonate, propane sultone, or a combination thereof. In another aspect the electrolyte is a polymer electrolyte.

Representative lithium salts useful in an electrolyte include but are not limited to $LiPF_6$, $LiBF_4$, $LiAsF_6$, $LiClO_4$, $LiCF_3SO_3$, $Li(CF_3SO_2)_2N$, $LiN(SO_2C_2F_5)_2$, $LiSbF_6$, $LiC(CF_3SO_2)_3$, $LiC_4F_9SO_3$, and $LiAlCl_4$. The lithium salt may be dissolved in the organic solvent. A combination comprising at least one of the foregoing can be used. The concentration of the lithium salt can be 0.1 to 2.0M in the electrolyte.

The battery may have any suitable configuration or shape, and may be cylindrical or prismatic.

Various aspects of the present disclosure are illustrated by the following non-limiting examples. The examples are for illustrative purposes and are not a limitation on any practice of the present invention. It will be understood that variations and modifications can be made without departing from the spirit and scope of the invention.

EXAMPLES

The average crystallite size of nanocrystals may be determined using powder X-ray diffraction patterns collected from a continuous scan between 12 and 120 degrees in 2-theta at 0.75 degrees/min using an automated Shimadzu XRD-6000 diffractometer with a Cu X-ray tube. Atomic structure analysis and crystallite size analysis may be performed using Rietveld refinement technique implemented in MDI Jade 7 program or another equivalent program. Procedures for atomic structure refinements are evident to those skilled in the art. Using these refinements, the a- and c-lattice parameters for the $LiNiO_2$ R-3m layered crystal structure and relative amount of $Ni^{2+}$ ions occupying the Li-site and the relative z-position of the oxygen atom may be obtained. Background curve of a 3rd-order polynomial and the Pseudo-Voigt profile shape function may be used for peak fitting. Peak broadening may be fit for both crystallite size and strain or for crystallite size only in MDI Jade. Crystallite size-fitting only (without strain) is used for determining the average primary crystallite size for materials synthesized under different reaction conditions. Instrumental FWHM calibration curve can be obtained by profile fitting diffraction pattern of a calibration standard, such a NIST SRM 640 Si or SRM 660 $LiB_6$ powders.

Example 1: Two Samples of Polycrystalline 2D α-$NaFeO_2$-Type Layered Structure Particles with Differing Crystallite Sizes Two electrochemically active polycrystalline 2D α-$NaFeO_2$-type layered structure particles having differing crystallite sizes with high nickel in the cathode material were prepared. The two prepared samples of polycrystalline 2D α-$NaFeO_2$-type layered structure had an overall composition $Li_{(0.98)}Mg_{(0.02)}Ni_{(0.881)}Co_{(0.115)}Al_{(0.004)}O_{(2.0)}$. One sample was made by calcining the green body at 700° C. and the second calcined at 680° C. The two materials were made from the same green body formulation comprising 80.21 g of micronized LiOH and 288.2 g of precursor hydroxide. The precursor hydroxide contained an atomically mixed combination of 90.2 at % Ni, 7.8 at % Co, and 2.0 at % Mg.

Two portions of the green body blend were then calcined with different heating curves under a stream of $CO_2$-free, dry air. The "high temperature" used to make the "large crystallite" ramped from 25° C. to 450° C. at 5° C./min with a soak time of 2 hours followed by a second ramp at 2° C./min to a maximum temperature of 700° C. and a soak time of 6 hours. The "low temperature" used to make the "small crystallite size" (representing a nanocrystal) ramped from 25° C. to 450° C. at 5° C./min with a soak time of 2 hours followed by a second ramp at 2° C./min to a maximum temperature of 680° C. and a soak time of 6 hours.

Each material was then permitted to naturally cool to 100° C. The calcined materials was first individually ground in a mortar and pestle and then milled in a jar mill. The "large crystallite" product was milled for 10 minutes while the "small crystallite size" material was milled for 5 minutes.

The properties of the two materials are summarized in Table 1. The two materials were subjected to a suite of tests to identify average oxidation state, residual lithium hydroxide, and ion mixing in the layered crystals. The synthesized materials were substantially identical from the typical metrics commonly used for characterizing cathode powders (oxidation state, residual lithium hydroxide, and cation mixing). The only significant difference was in the average crystallite.

TABLE 1

Properties of the large crystallite and small crystallite (nanocrystal) materials.

| Test | Large Crystallite Size Material | Small Crystallite Size Material | Description |
| --- | --- | --- | --- |
| Average Oxidation State of the transition metals | 2.98+ | 2.99+ | Redox titration |
| Residual Lithium Hydroxide (wt %) | 0.08% | 0.06% | Extraction and titration Result is weight % |
| Ion Mixing (% of Li-sites occupied by ions with 2+ oxidation state) | 1.6% | 1.6% | Rietveld Refinement of X-Ray Diffraction measurements of the powder |
| Average Crystallite Size (nm) | 87 | 65 | Determined from peak broadening of X-Ray Diffraction measurements of the powder (fitted for crystallite size only, no strain) |

Prior to forming electrodes, the synthesized powders were coated to enrich grain boundaries with a mixture of cobalt and aluminum, sufficient to make the aforementioned formulation, using an identical process. After coating both materials, the materials were subjected to another heat treatment under flowing $CO_2$-free, dry air. The heating curve used for this treatment was a ramp from 25° C. to 450° C. at 5° C./min with a soak time of 1 hour followed by a second ramp at 2° C./min to 700° C. and a soak time of 2 hours. The materials were then naturally cooled to 100° C. and were milled for 5 minutes in a jar mill. The resulting parameters of the grain boundary enriched materials are illustrated in Table 2.

TABLE 2

Fitted XRD parameters for coated materials with 4 at % Co enrichment at the grain boundary.

| Material Synthetic Temp | a (Å) | c (Å) | $z_O$ | $Ni^{2+}$ | XS (nm) Average Crystallite size fitted without strain |
| --- | --- | --- | --- | --- | --- |
| Large Crystallite Size Material | 2.873 | 14.186 | 0.241 | 1.7% | 109 |
| Small Crystallite Size Material | 2.873 | 14.186 | 0.241 | 2.0% | 77.8 |

The materials were each blended with PVDF binder and conductive carbon in a slurry of NMP solvent and coated onto an aluminum foil current collector. Cathode electrodes were then punched out of the foil and combined with MCMB graphite anodes, porous polypropylene separators and carbonate based electrolytes in a "full" coin cell format for electrochemical cycle life testing. The cathode electrodes were also combined with lithium metal anodes, porous polypropylene separators and carbonate based electrolytes in a "half" coin cell format for electrochemical discharge capacity testing.

The results of the half-cell testing are shown in Table 3, below. A high discharge capacity of greater than 205 mAh/g at C/20 is achieved for both samples.

TABLE 3

Electrochemical Discharge Capacity Testing Results

| Cathode Type | C/20 Charge mAh/g | C/20 Discharge mAh/g | Efficiency | 1C Discharge mAh/g | 5C Discharge mAh/g |
| --- | --- | --- | --- | --- | --- |
| Large Crystal Cathode | 230 | 212 | 92% | 189 | 178 |
| Nanocrystal Cathode | 231 | 214 | 92% | 189 | 177 |

Figure 2:
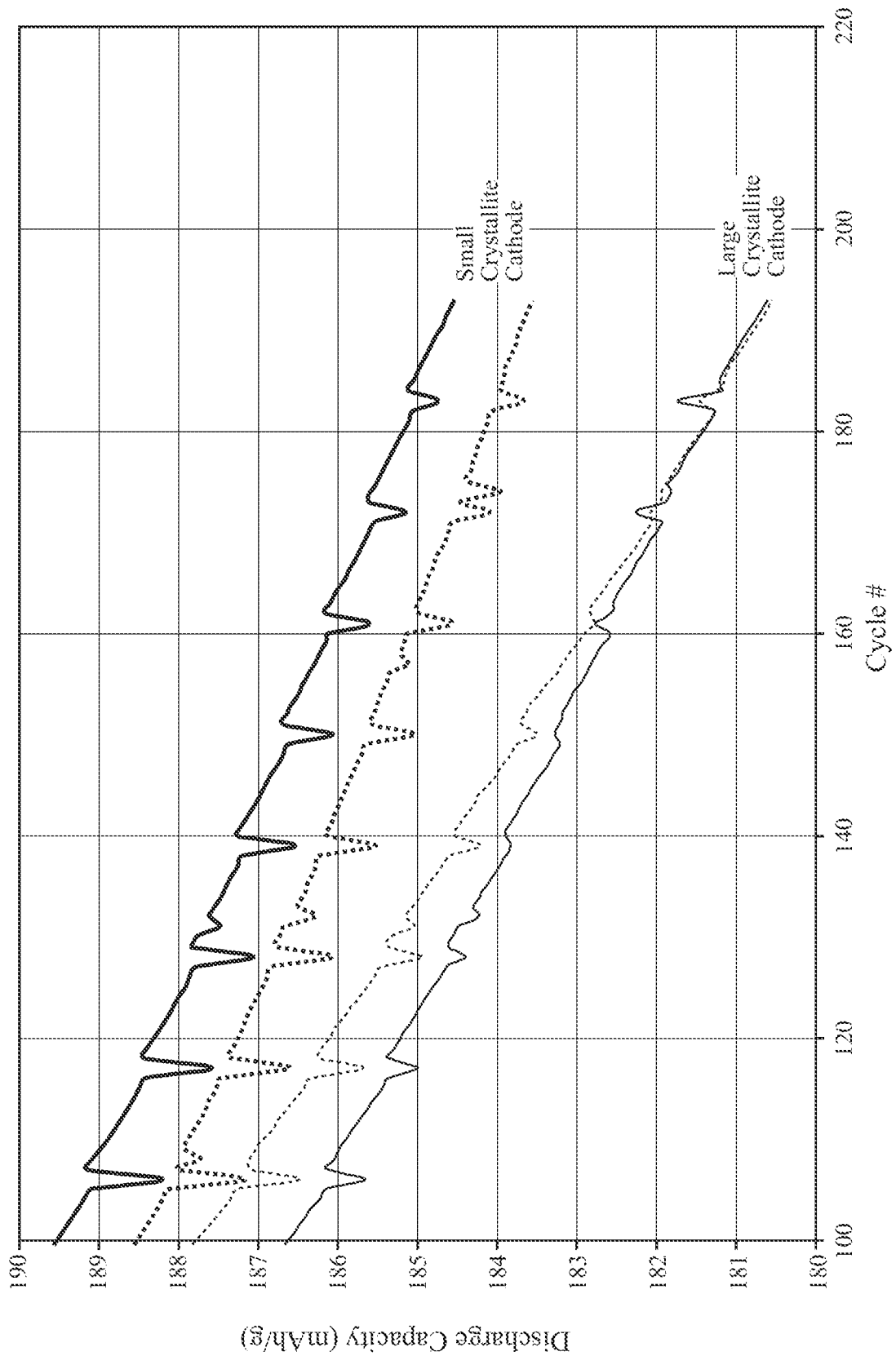
FIG. 2 is a graph depicting discharge performance of cathode materials with large (109 nm) and small crystallite size (78 nm) between cycles 100 and 200 for duplicate cells according to one or more aspects described herein.
Figure 3:
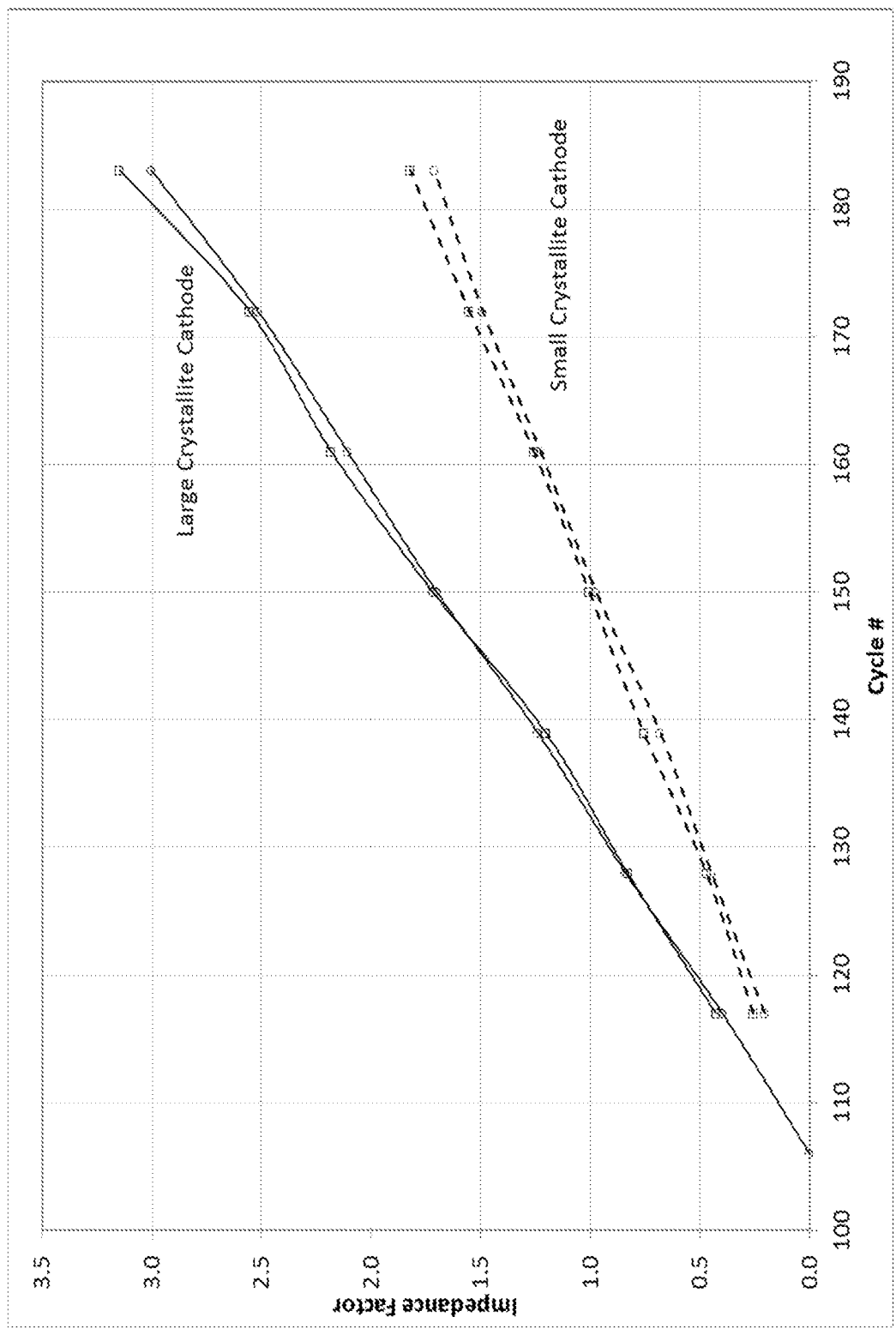
FIG. 3 is a graph depicting impedance values for duplicate cells containing cathode materials with large and small crystals corresponding to the discharge performance data shown in FIG. 3 according to one or more aspects described herein.

The full cells were cycled through a series of charge and discharge cycles at room temperature initially and then at 45° C. The results for the tests at 45° C. between cycles 100 and 200 are shown in the FIGS. 2 and 3, below. FIG. 2 is a graph of the discharge capacity fade between cycles 100 and 200 at 45° C. for duplicate cells containing cathode materials with large crystals or nanocrystals. FIG. 3 illustrates the increase in dimensionless impedance value for duplicate cells containing cathode materials with large crystallite size or small crystallite size (e.g., nanocrystals) corresponding to the cycling data shown in FIG. 2. The impedance value was measured every 20 charge/discharge cycles. Note the improvement in the initially high discharge capacity and initially low impedance for the materials with the small nanocrystals. More specifically, a residual capacity of 85% or greater is achieved at cycle 200. Further, the capacity retention during cycling is better and the rate of impedance growth is lower for the material with small nanocrystals.

Example 2: Four Cathode Powders with $Li_{(0.98)}Mg_{(0.02)}Ni_{(0.863)}Co_{(0.131)}Al_{(0.006)}O_{(2.0)}$ Formulation Differing in Crystallite Size Four electrochemically active polycrystalline 2D α-NaFeO$_2$-type layered structure particles having differing crystallite sizes with high nickel were prepared. The four prepared samples of polycrystalline 2D α-NaFeO$_2$-type layered structure each had an overall composition $Li_{(0.98)}Mg_{(0.02)}Ni_{(0.863)}Co_{(0.131)}Al_{(0.006)}O_{(2.0)}$.

A green body blend was synthesized from two powder components substantially as in Example 1. The powders were combined in a ½ gallon HDPE bottle and shaken on a paint shaker for 10 minutes to produce thorough mixing. This green body blend was then calcined with a controlled air atmosphere whereby water and $CO_2$ were minimized. Calcination formed a sintered ceramic product which was subsequently processed to form a free-flowing powder.

The two powders combined into the green body were micronized lithium hydroxide and a mixed metal hydroxide. The lithium hydroxide was micronized by shaking 250 g with 1200 g of yttrium stabilized zirconia (YSZ) media (spherical, ¼" dia) in a ½ gallon HDPE bottle for 45 minutes. The mixed metal hydroxide had a metal composition that was 90 at % Ni, 8 at % Co and 2 at % Mg. This was made by a precursor supplier, Hunan Brunp Recycling Technology Co. Ltd., using standard methods for preparing nickel-hydroxide based materials.

The first calcination heating curve followed two ramp/dwells followed by natural cooling to 130° C. whereupon it was subsequently processed. The first ramp/dwell was from ambient to 450° C. at 5° C./min with a 2 hour hold while the second was from 450° C. to a maximum temperature at 2° C./min with a 6 hour hold. Four sets of materials were calcined with four different maximum temperatures of 640° C., 660° C., 680° C. and 700° C.

For the materials made at the three lowest temperatures (i.e., 640° C., 660° C., and 680° C.), a single green body blend was made from 252 g of lithium hydroxide and 961 g of mixed metal hydroxide powder. This was then split into thirds and each third placed into one of three crucibles for calcination. After calcination, subsequent processing comprised initially breaking up the sintered cake with a mortar and pestle so that the resulting powder passed through a #35 sieve. The powder was then jar milled in a 1 gallon jar with 2 cm drum YSZ media for 5 minutes and sieved through a #270 sieve.

The material calcined at 700° C., comprised a green body blend made from 252 g of lithium hydroxide and 941 g of mixed metal hydroxide. This blend was calcined in 9 crucibles evenly spread across three identically programmed furnaces. After calcination, subsequent processing comprised initially breaking up the sintered cake with a mortar and pestle so that the resulting powder passed through a #35 sieve. The powder was then jar milled in a 1 gallon jar with 2 cm drum YSZ media for 10 minutes and sieved through a #270 sieve.

Prior to forming electrodes, the synthesized powders were coated with a mixture of cobalt and aluminum, sufficient to make the aforementioned formulation, using an identical process. After coating both materials, the materials were subjected to another heat treatment under flowing $CO_2$-free, dry air. The heating curve used for this treatment was a ramp from 25° C. to 450° C. at 5° C./min with a soak time of 1 hour followed by a second ramp at 2° C./min to 700° C. and a soak time of 2 hours. The materials were then naturally cooled to 100° C. and were milled for 5 minutes in a jar mill.

Electrode coatings were made for each of the four cathode powders by blending the cathode powder with PVdF (Kureha KF-1120) and carbon (Denka black) in N-methylpyrrolidinone to form a slurry, and then coating each slurry onto an aluminum foil current collector. Cathodes were then punched from the coated aluminum foil.

Half cells were assembled by combination of the cathode with lithium foil, a polyolefin separator (Celgard 2500) and an electrolyte of 1 M $LiPF_6$ in 1/1/1 (vol.) EC/DMC/EMC with 1 wt. % VC (Kishida Chemical) in a 2025 coin cell. The capacity of each cell was determined by calculation from the electrode weight, assuming a capacity of 200 mAh/g cathode material. The cells were then charged to 4.3 V at C/20, and discharged at rates from C/20 to 5C. With respect to charge or discharge rates, C refers to the C-rate, which is the rate to charge or discharge the cell in one hour. The results of the half-cell analysis are shown in Table 4.

TABLE 4

| Cathode Synthetic | Half Cell results | | | |
|---|---|---|---|---|
| | Discharge Capacity (mAh/g) | | | Ratio of |
| Temperature | C/20 | C/5 | 2C | 2C to C/5 |
| 700° C. | 211 | 203 | 184 | 90.9% |
| 680° C. | 210 | 199 | 181 | 91.0% |

TABLE 4-continued

| Cathode Synthetic | Half Cell results | | | |
|---|---|---|---|---|
| | Discharge Capacity (mAh/g) | | | Ratio of |
| Temperature | C/20 | C/5 | 2C | 2C to C/5 |
| 660° C. | 206 | 194 | 177 | 91.2% |
| 640° C. | 206 | 194 | 176 | 90.7% |

Full cells were assembled by combination of the cathode with a graphitic anode, a polyolefin separator (Celgard 2500) and an electrolyte of 1 M $LiPF_6$ in 1/1/1 (vol.) EC/DMC/EMC with 1 wt. % VC (Kishida Chemical) in a 2025 coin cell the cathode half of which had been coated with aluminum. The capacity of each cell was determined by calculation from the electrode weight, assuming a capacity of 200 mAh/g cathode material. The anode was matched to the cathode weight such that the anode capacity exceeded the cathode by a factor ranging from 1.27 to 1.30.

The graphitic anode coating used MCMB 1028 active materials and was made by blending the active with PVdF (Kureha KF-1120) and carbon (Denka black) in N-methylpyrrolidinone to form a slurry, and then coating each slurry onto a copper foil current collector. Anodes were then punched from the coated copper foil.

The full coin cells were then formed at C/5 at 25° C. and cycled at 45° C. with a charging current of 1.5C to 4.25 V and a discharging current that ended at 1C at 2.7 V. Every 20 cycles, the capacity and impedance were characterized by charging the cell at 1C rate to 4.2V (CCCV) and discharging it to 2.7 V. The time spent at constant voltage (i.e., CV step) during this characterization step was used as a measure of the impedance.

TABLE 5

| XRD Crystallite Size and Impedance Factor | | |
|---|---|---|
| Calc Temp (deg. C.) | Crystallite Size Final Product (nm) | Impedance Factor Slope |
| 700 | 82.4 | 0.028 |
| 680 | 71.8 | 0.019 |
| 660 | 63.1 | 0.018 |
| 640 | 52.3 | 0.024 |

The crystallite sizes were determined using powder X-ray diffraction patterns collected using a continuous scan between 12 and 120 degrees in 2-theta at 0.75 degrees/min using an automated Shimadzu XRD-6000 diffractometer with a Cu X-ray tube. Atomic structure analysis and crystallite size analyses were performed using Rietveld refinement technique implemented in MDI Jade 7 program. Procedures for atomic structure refinements are evident to those skilled in the art. Using these refinements, the a- and c-lattice parameters for the $LiNiO_2$ R-3m layered crystal structure and the relative amount of $Ni^{2+}$ ions occupying the Li-site and the relative z-position of the oxygen atom were obtained. Background curve of a 3rd-order polynomial and the Pseudo-Voigt profile shape function was used for peak fitting. Peak broadening was fit for crystallite size only (with no strain). Instrumental FWHM calibration curve was obtained by profile fitting diffraction pattern of a NIST 640c Si calibration standard. Crystallite size-fitting without strain is used for determining the average primary crystallite size for materials synthesized under different reaction conditions. Results are illustrated in Table 6.

TABLE 6

XRD Parameters for Materials made at a range of temperatures before coating.

| Material Synthetic Temp | a (Å) | c (Å) | $z_O$ | $Ni^{2+}$ | XS (nm) Crystallite size fitted without strain |
|---|---|---|---|---|---|
| 700° C. | 2.873 | 14.193 | 0.241 | 1.7% | 87.0 |
| 680° C. | 2.873 | 14.193 | 0.241 | 1.5% | 68.5 |
| 660° C. | 2.873 | 14.193 | 0.241 | 1.8% | 56.6 |
| 640° C. | 2.872 | 14.186 | 0.241 | 2.3% | 38.4 |

After the coating is applied and the materials are recalcined for a short period, some crystal growth is observed by XRD for most materials. For 700° C. calcination the apparent slight decrease in crystallite size is observed as a result of slight lattice parameter distortion caused by grain boundary enrichment. However, the same sequential ordering in size created in the original calcination is maintained. Also the disorder has been maintained at low levels with $Ni^{2+}$ value remaining below 3.5 at % Ni.

TABLE 7

XRD Parameters for Materials made at a range of temperatures after coating with 6 at % Co enrichment.

| Material Synthetic Temp | a (Å) | c (Å) | $z_O$ | $Ni^{2+}$ | XS (nm) Crystallite size fitted without strain |
|---|---|---|---|---|---|
| 700° C. | 2.872 | 14.186 | 0.241 | 2.4% | 82.4 |
| 680° C. | 2.873 | 14.194 | 0.241 | 2.5% | 71.8 |
| 660° C. | 2.874 | 14.192 | 0.241 | 3.1% | 63.1 |
| 640° C. | 2.873 | 14.189 | 0.241 | 2.5% | 52.3 |

Figure 4:
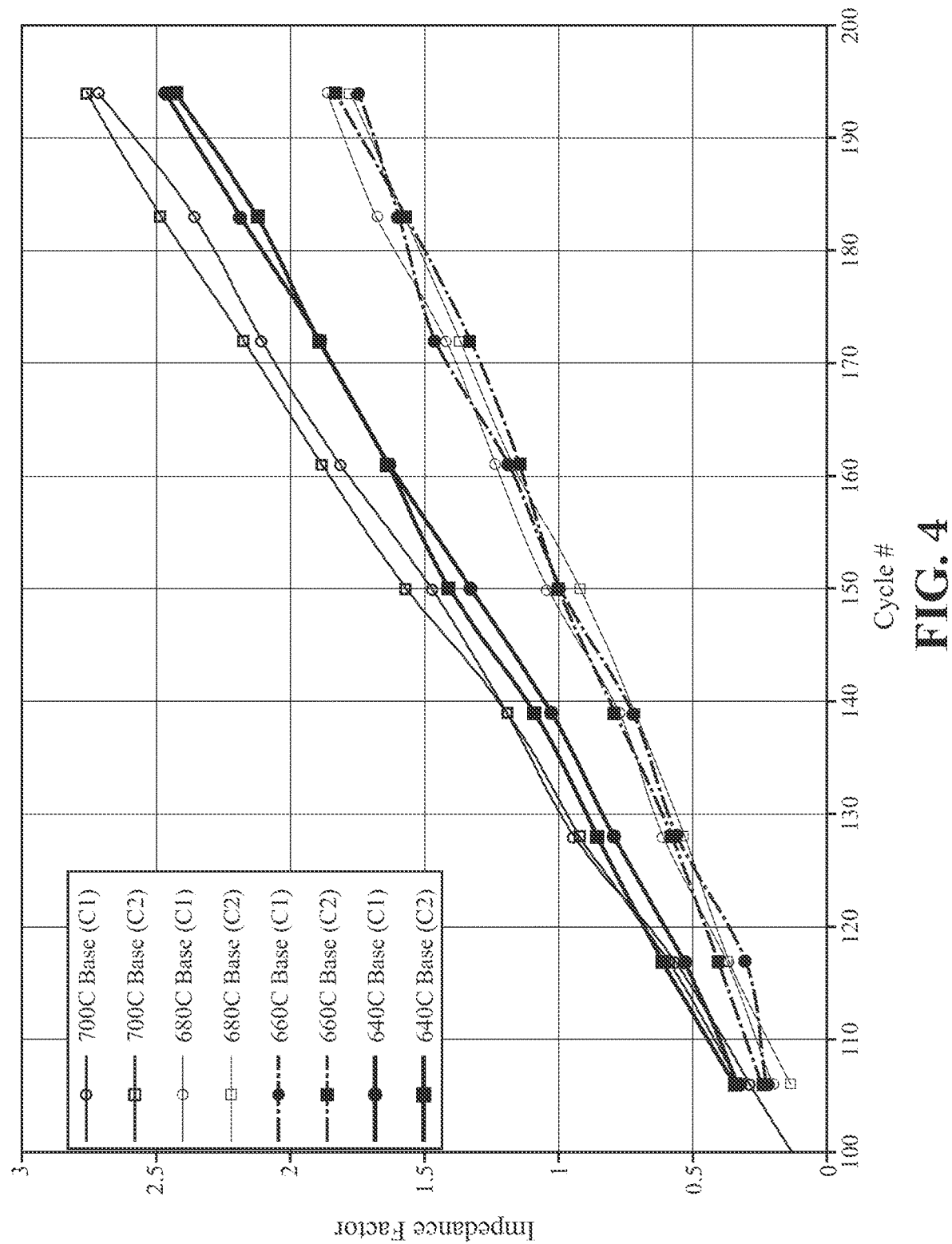
FIG. 4 is a graph depicting impedance values between cycles 100 and 200 for duplicate cells containing cathode materials having a range of crystallite sizes formed through calcination at temperatures of 700 degrees Celsius or less according to one or more aspects described herein.

Referring now to FIG. 4, a graph depicting impedance values between cycles 100 and 200 for two samples of each of the four cathode powders wherein the first calcination was performed at temperatures of 700 degrees Celsius or less is depicted. As shown, crystallite size decreases as the maximum calcination temperature decreases. Additionally, the impedance slope, quantified in Table 5, also decreases with calcination temperature, notwithstanding calcination at 640 degree Celsius where the impedance slope increases. A calcination maximum temperature of less than 700 degree Celsius and greater than 640 degree Celsius achieves a low rate of impedance growth during charge/discharge cycling of the battery and high discharge capacity as depicted in Table 4.

It should now be understood that aspects described herein may be directed to compositions and methods of manufacturing of positive electrode (cathode) active materials for Li-ion batteries with small nanocrystals in order to reduce the rate of impedance growth during charge/discharge cycling of the battery. The described compositions and methods of manufacturing include active polycrystalline particles forming positive electrodes that achieve materials with an average crystallite size of 85 nm or less (or 105 nm or less for grain boundary enriched particles) in high-nickel formulations and also have high discharge capacity that is greater than or equal to 205 mAh/g at C/20. The provided compositions and methods of manufacturing for the positive electrode (cathode) active materials exhibit dramatically enhanced electrochemical performance and stability whereby lithium is de-intercalated and re-intercalating into the crystal lattice.

The foregoing description is illustrative of particular aspects of the invention, but is not meant to be a limitation upon the practice thereof. The following claims, including all equivalents thereof, are intended to define the scope of the invention.

The invention claimed is:

1. An electrochemically active polycrystalline particle comprising:
    a plurality of nanocrystals, the plurality of nanocrystals comprising a first composition defined by $Li_{1+x}MO_{2+y}$, wherein
        $-0.1 \leq x \leq 0.3$,
        $-0.3 \leq y \leq 0.3$, and
        wherein M comprises nickel at greater than or equal to 80 atomic percent; and
    said plurality of nanocrystals having an average crystallite size of less than or equal to 85 nanometers as measured by X-ray diffraction.

2. The particle of claim 1, wherein said size of said plurality of nanocrystals have an average crystallite size greater than or equal to 50 nanometers to less than or equal to 85 nanometers.

3. The particle of claim 1, wherein said size of said plurality of nanocrystals is less than or equal to 80 nanometers.

4. The particle of claim 1, wherein said size of said plurality of nanocrystals is less than or equal to 70 nanometers.

5. The particle of claim 1 wherein M further comprises one or more elements selected from the group consisting of Al, Mg, Co, Mn, Ca, Sr, Zn, Ti, Zr, Y, Cr, Mo, Fe, V, Si, Ga and B.

6. The particle of claim 1, wherein M comprises nickel at an atomic percent greater than or equal to 95%.

7. The particle of claim 1, further comprising an outer coating on a surface of the particle, the outer coating comprising:
    an oxide of one or more elements selected from Al, Zr, Y, Co, Ni, Mg, and Li;
    a fluoride comprising one or more elements selected from Al, Zr, and Li;
    a carbonate comprising one or more elements selected from Al, Co, Ni, Mn, and Li; or
    a phosphate comprising one or more elements selected from Al and Li.

8. An electrochemically active polycrystalline secondary particle comprising:
    a plurality of nanocrystals, the plurality of nanocrystals comprising a first composition defined by the formula $Li_{1+x}MO_{2+y}$, wherein
        $0.0 \leq x \leq 0.3$,
        $-0.3 \leq y \leq 0.3$, and
        wherein M comprises nickel at greater than or equal to 80 atomic percent;
    said plurality of nanocrystals having a size of less than or equal to 105 nanometers as measured by X-ray diffraction;
    a grain boundary between adjacent nanocrystals of said plurality of nanocrystals and comprising a second composition optionally having an α-$NaFeO_2$-type layered structure, a cubic structure, or a combination thereof, wherein a concentration of cobalt in said grain boundary is greater than a concentration of cobalt in said nanocrystals.

9. The particle of claim 8 wherein a concentration of cobalt in the nanocrystals is about 0.25 to about 17 atomic percent, and a concentration of cobalt in the grain boundary is about 0.5 to about 32 atomic percent, each based on a total atomic composition of the particle.

10. The particle of claim 8 wherein M further comprises one or more elements selected from the group consisting of Al, Mg, Co, Mn, Ca, Sr, Zn, Ti, Zr, Y, Cr, Mo, Fe, V, Si, Ga and B, said one or more elements residing in a Li layer, a M layer, or both, of the nanocrystals.

11. The particle of claim 8 wherein said size of said plurality of nanocrystals is 70 to 100 nanometers, optionally 75 to 90 nanometers.

12. The particle of claim 8, wherein M comprises an atomic percent of nickel greater than or equal to 90%.

13. A method of manufacturing an electrochemically active particle, said method comprising:
providing a first mixture, said first mixture comprising lithium hydroxide or its hydrate and a precursor hydroxide comprising nickel;
calcining said first mixture to a maximum temperature of less than 700° C. to form a first material comprising a plurality of nanocrystals having a size of less than or equal to 85 nanometers as measured by x-ray diffraction;
combining said first material with a second material comprising cobalt or a combination of cobalt and aluminum to form a second mixture; and
heat treating said second mixture to a second maximum temperature of 725° C. or less, to produce a particle further comprising a grain boundary between adjacent nanocrystals, said grain boundary comprising a second composition optionally having an $\alpha$-NaFeO$_2$-type layered structure, a cubic structure, or a combination thereof, wherein a concentration of cobalt in said grain boundary is greater than a concentration of cobalt in said nanocrystals; and wherein the plurality of nanocrystals have a size of less than or equal to 105 nanometers.

14. The method of claim 13, wherein said step of calcining said first mixture comprises:
increasing a temperature from about 25° C. to about 450° C. at about 5° C./minute;
soaking at said temperature of about 450° C. for about 2 hours,
increasing said temperature from about 450° C. to a maximum temperature of about 650° C. to about 699° C.; and
soaking at said maximum temperature of about 650° C. to about 699° C. for about 6 hours.

15. The method of claim 13 wherein said maximum temperature of said calcining said first mixture is 680° C. or less.

16. The method of claim 13, wherein said average size of said plurality of nanocrystals are greater than or equal to 50 nanometers to less than or equal to 105 nanometers.

17. The method of claim 13, wherein said particle comprises nickel at an atomic percent greater than or equal to 80%.

18. The method of claim 13, wherein said particle comprises nickel at an atomic percent greater than or equal to 90%.

* * * * *